United States Patent [15] 3,645,073
Gomes et al. [45] Feb. 29, 1972

[54] CANE CUTTER

[72] Inventors: Franklin P. Gomes; Donald K. Andrews, both of Hawi, Hawaii

[73] Assignee: Kohala Sugar Co., Hawi, Hawaii

[22] Filed: June 2, 1970

[21] Appl. No.: 42,845

Related U.S. Application Data

[63] Continuation-in-part of Ser. No. 736,792, June 13, 1968, abandoned.

[52] U.S. Cl. ............................................. 56/13.8, 56/16.4
[51] Int. Cl. ............................................................ A01d 45/10
[58] Field of Search ................. 56/13.5, 13.6, 13.7, 13.8, 56/13.9, 14.3, 14.7, 16.4, 17.3, 53, 102, 229, 317

[56] References Cited

UNITED STATES PATENTS 1,975,089 10/1934 Falkiner et al. ......................... 56/16.4
2,305,254 12/1952 Hirschkorn ............................. 56/15.2
1,710,611 4/1929 Duncan ................................... 56/13.9
3,517,489 6/1970 Alexandrino et al. ................. 56/13.7

Primary Examiner—Antonio F. Guida
Attorney—Lyon & Lyon

[57] ABSTRACT

A track laying crawler-type tractor has a high-clearance frame to define a throat between the crawler tracks of sufficient height and width to pass over two rows of sugarcane growing as a mat in the field and ready to harvest. Cutting means are connected to the frame to sever both rows of cane from the ground. Additional cutting means on the frame extending outward from the crawler tracks may also be provided to sever additional rows of growing cane. A power-driven upright rotary knife in front of each crawler track at the side boundaries of the throat serves to divide the mat of growing cane to permit the crawler tracks to pass therethrough. The cane mat is thus severed from the ground along the path of the tractor without substantially disturbing its position in the field.

6 Claims, 10 Drawing Figures

Patented Feb. 29, 1972

INVENTORS.
FRANKLIN P. GOMES
DONALD K. ANDREWS
BY
Lyon & Lyon
ATTORNEYS

Patented Feb. 29, 1972

INVENTORS.
FRANKLIN P. GOMES
BY DONALD K. ANDREWS

ATTORNEYS

Patented Feb. 29, 1972

INVENTORS.
FRANKLIN P. GOMES
DONALD K. ANDREWS
BY
ATTORNEYS

INVENTORS.
FRANKLIN P. GOMES
DONALD K. ANDREWS
BY
Lyon & Lyon
ATTORNEYS

Patented Feb. 29, 1972　　3,645,073

INVENTORS.
FRANKLIN P. GOMES
DONALD K. ANDREWS
BY
Lyon & Lyon
ATTORNEYS 3,645,073

CANE CUTTER

This application is a continuation-in-part of copending application, Ser. No. 736,792 filed June 13, 1968, now abandoned.

This invention relates to harvesting of sugarcane of the type grown in Hawaii. A typical flat culture Hawaiian sugarcane field comprises sugarcane plants spaced about 2 feet apart in each row, the rows being spaced 4½ or 5 feet apart. The sugarcane plant is a giant grass and consists of stalks much like cornstalks, and a root portion often referred to as a "stool." Each stalk has long narrow leaves, much like a corn plant. Unlike a corn plant, which has one stalk, the sugar cane plant has many stalks, each of which at maturity may be well over 10 feet in length and 1 to 2 inches in diameter. The stalks are initiated from the roots at various times during the growth of the plant, and an initial primary stalk, several secondary stalks, and on occasion tertiary and even quarternary stalks may be present. At harvest, each sugarcane plant may have 10 or more stalks in a cluster.

Another contrast with a cornfield is the growth characteristic of sugarcane stalks in Hawaiian fields. Whereas cornstalks are erect, Hawaiian sugarcane stalks are partially recumbent. Initial growth is upright, but as the stalks increase in length, the weight of the stalks and the pressure of wind in areas of more or less constant unidirectional winds exceed the strength of the stalks, and they lean over. Thereafter growth, other than that of the growing tip, tends to be in a horizontal or diagonal direction, rather than vertical. The net result is that the stalks tend to form a loosely intermeshed mat of sugarcane covering the ground. The density and height of this mat will vary with the length of the stalks (sometimes as long as 30 feet) and the cane tonnage (varying from 60 to 140 tons to the acre). A characteristic of this mat is that it is practically incompressible insofar as harvesting or other field machinery is concerned. If pressure is exerted horizontally against the mat, compression will take place for the distance of only a foot or so, but then the mat will not compress further under available forces. Present day mechanical harvesters may not be able to advance into the mat, or the sugarcane may "ball up," either breaking or being drawn up by the roots in the process of rolling up rather than compressing. This "balling up" results in two substantial difficulties. First it causes an entrainment of soil which increases separation costs at the mill. Second, it pulls up roots which results in increased replanting costs since several crops may grow from properly severed roots.

Since Hawaiian canefields are not subject to frost, the cane is matured for periods of from 18 months to 3 years, with substantial economic benefits resulting from the far greater sugar yields of the more mature cane. This longer growing season, however, does result in the mat described above. Ideally, the cane stalks should be cut at ground level or an inch or two below. Present day mechanical harvesters have sometimes torn out roots and all, and sometimes cut several inches above the ground, wasting sugarcane that might otherwise be processed for sugar.

It is the principal object of the present invention to provide a cane cutter device for use in cutting cane mats of the type grown in flat culture in Hawaii. Another object is to provide such a device which moves through the cane mat, severing the stalks, but does not gather or lift the cane from the ground. Another object is to provide a cane cutter which is capable of severing the stalks from a row of cane without the necessity of gathering up the adjacent previously severed row. Another object is to provide such a device which may enter the canefield at any point. A more detailed object is to provide such a device having severing knives midway of the length of the device for minimizing up and down motion, resulting in cleaner, less damaged cane. Another object is to provide such a device in which the cane stalks are cut quickly with minimal damage to the cut cane stalks and to the roots, and with minimum entrainment of soil.

Figure 1:
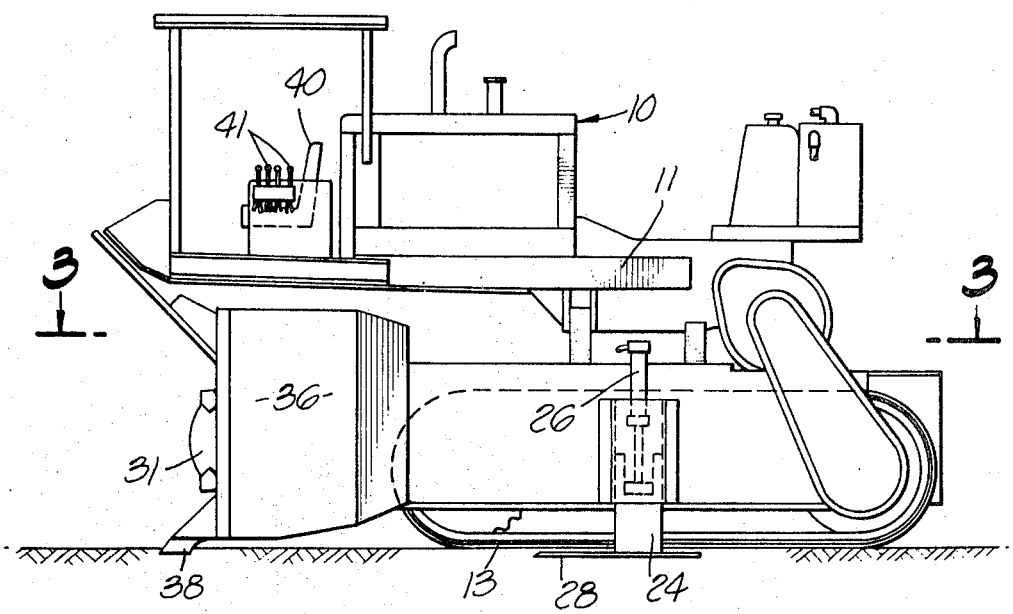
FIG. 1 is a side elevation showing a preferred form of our invention.
Figure 2:
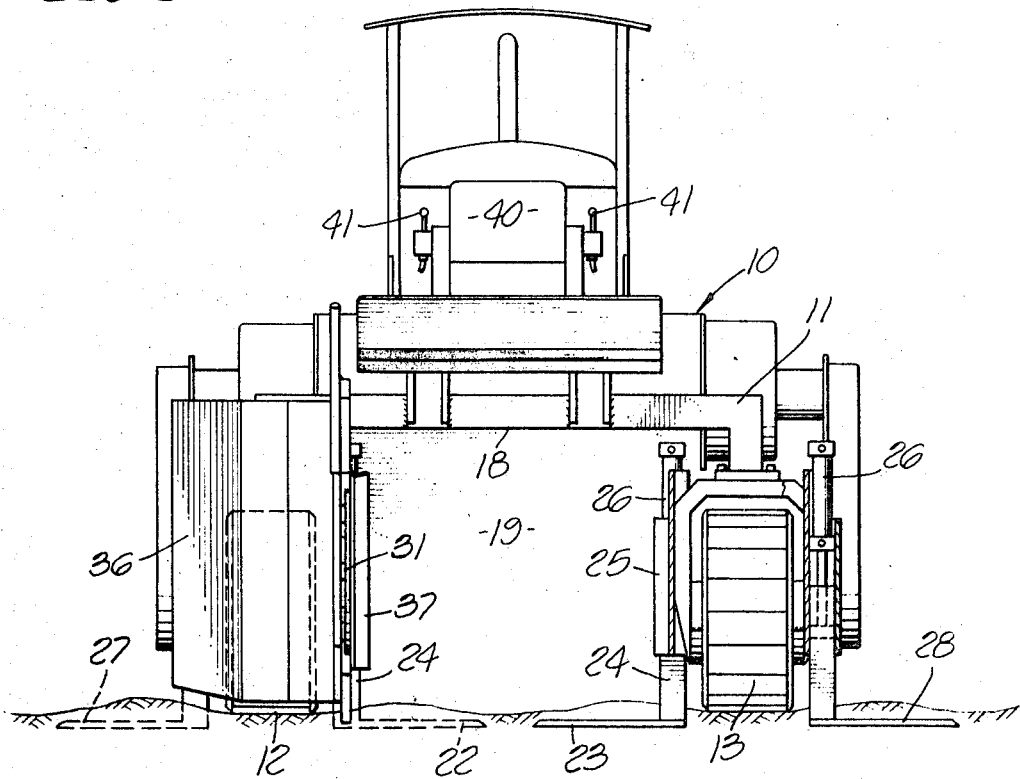
FIG. 2 is a front elevation thereof, partly in section.
Figure 3:
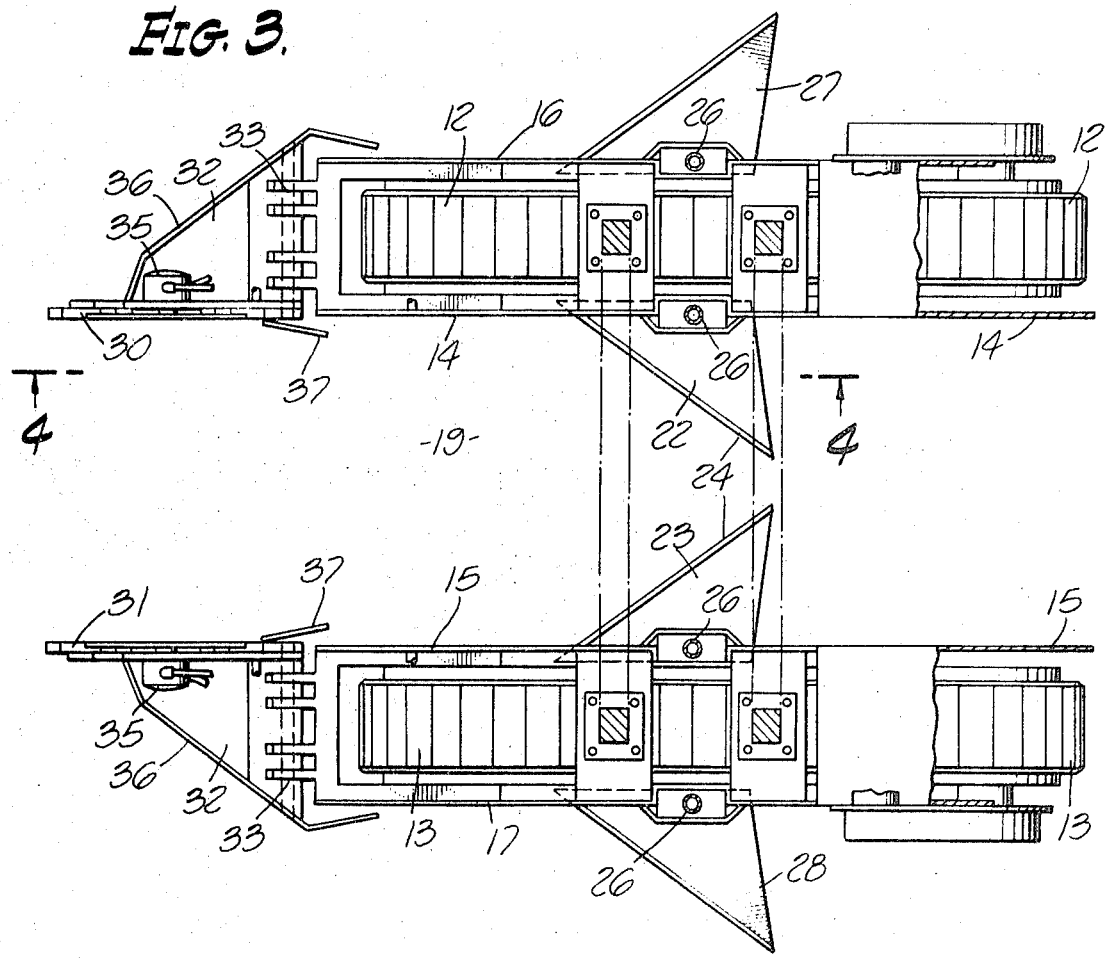
FIG. 3 is a sectional view taken substantially on the lines 3—3 as shown in FIG. 1.
Figure 4:
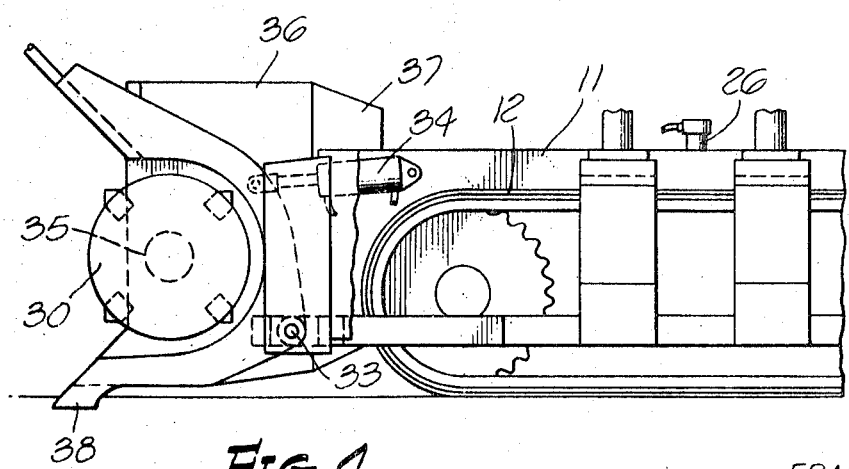
FIG. 4 is a sectional side elevation partly broken away, taken substantially on the lines 4—4 as shown in FIG. 3.
Figure 5:
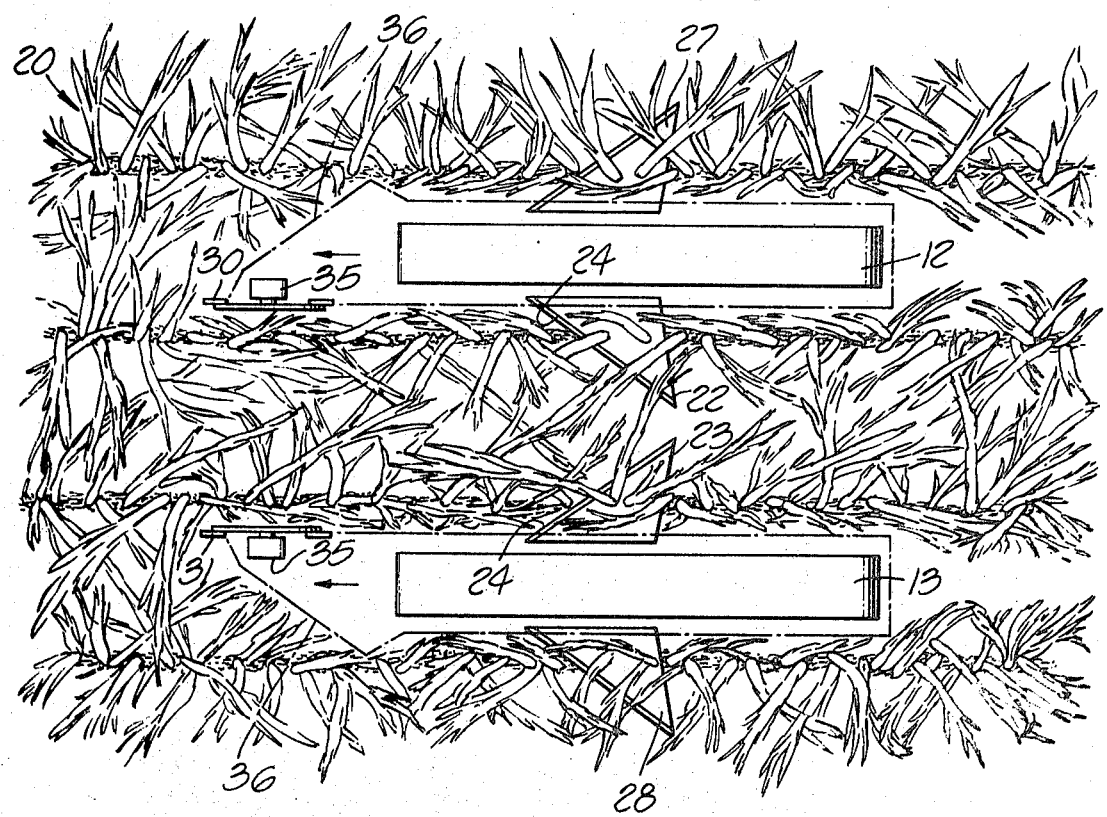
FIG. 5 is a diagrammatic plan view similar to FIG. 3, showing the passage of the crawler treads and shielding through the canefield mat.
Figure 9:
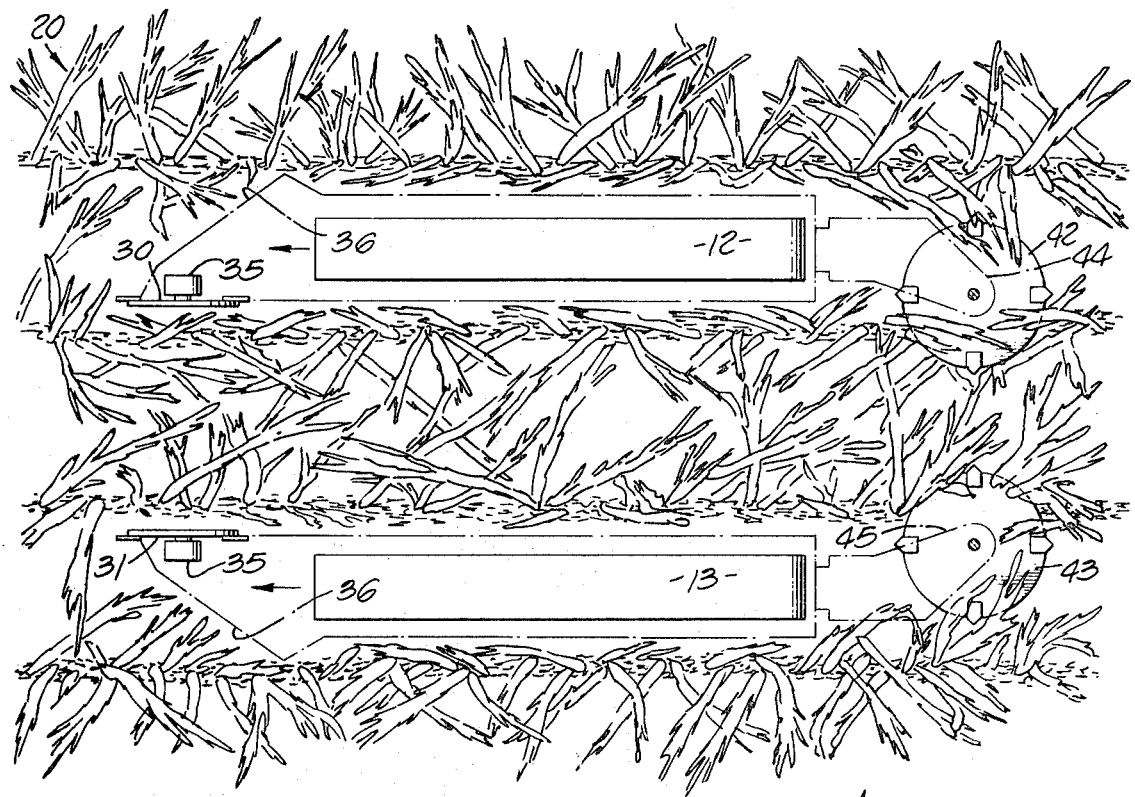
FIG. 9 is a diagrammatic plan view similar to FIG. 7, showing the passage of the crawler treads and shielding through the canefield mat.
Figure 10:
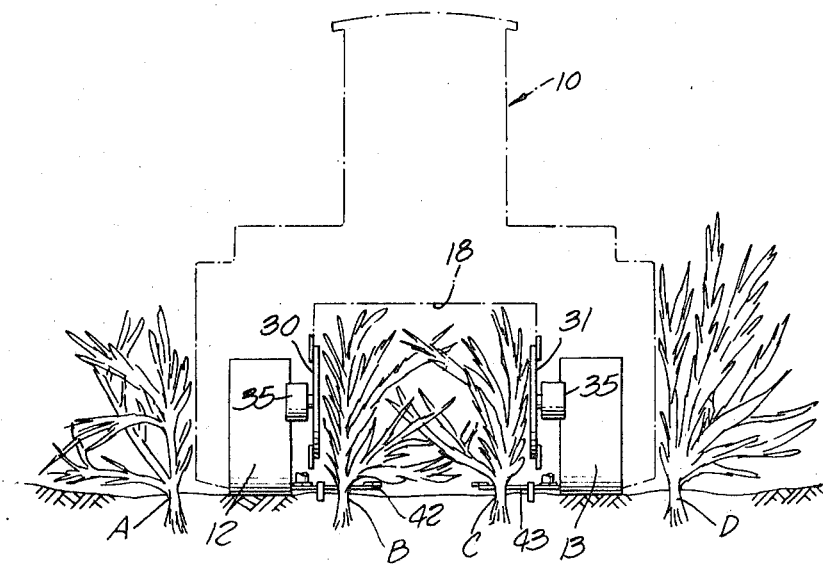
FIG. 10 is a diagrammatic front elevation of the device shown in FIG. 9.

Referring to the drawings, a track laying tractor generally designated 10 is provided with a frame 11 supported by power-driven crawler tracks 12 and 13. The crawler tracks are parallel and are laterally spaced for the proper distance to roll between rows of sugarcane plants, with two rows of plants between the crawler tracks. This is shown diagrammatically in FIGS. 6 and 10, where the crawler track 12 rolls in the space between row A and row B, and crawler track 13 rolls in the space between row C and row D. Inboard shield plates 14 and 15 and outboard shield plates 16 and 17 form a part of the frame and serve as lateral enclosures for the crawler tracks 12 and 13. The shield plates 14 and 15 and the undersurface 18 of the frame 11 cooperate to define an open throat 19 between the crawler tracks of sufficient height and width to pass over two rows of cane in the mat 20 (see FIGS. 5 and 9).

Figure 6:
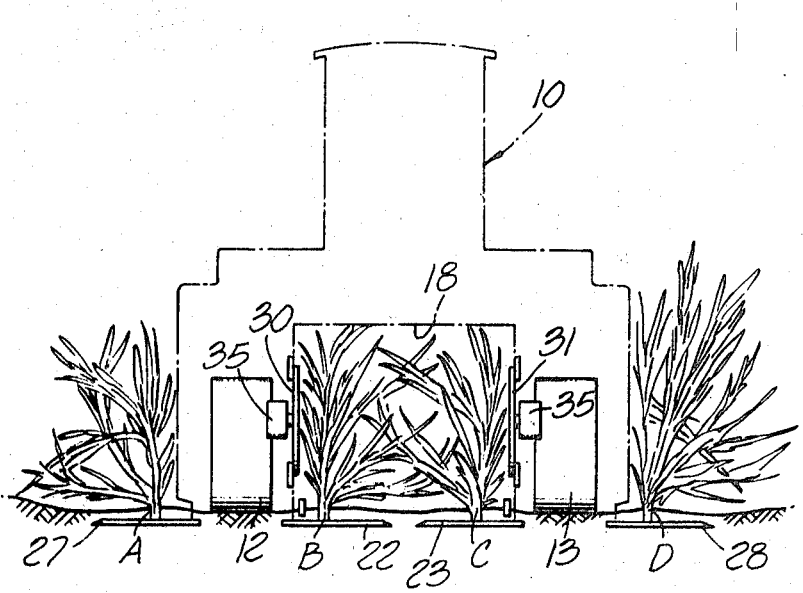
FIG. 6 is a diagrammatic front elevation of the device shown in FIG. 5.
Figure 7:
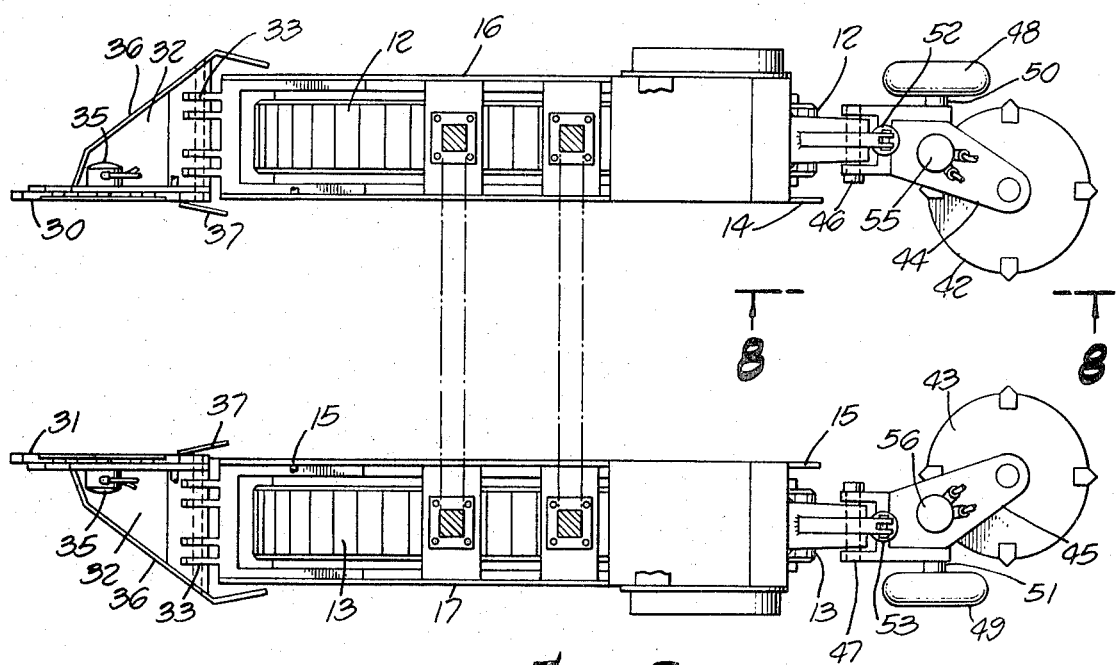
FIG. 7 is a plan view similar to FIG. 4 showing horizontal rotary cutters in place of ground knives.

Ground knives 22 and 23 are mounted for vertical adjustment on the frame 11, and each is provided with an angles cutting edge 24. As shown in FIG. 6, the ground knife 22 is positioned to cut cane stalks in row B, and ground knife 23 is positioned to cut cane stalks in row C. Each of these ground knives is fixed to a vertical post 24 mounted to slide in a bracket 25 fixed to the frame 11 between the ends of the crawler tracks 12 and 13. A double-acting hydraulic cylinder assembly 26 is provided for moving the posts and ground knives vertically with respect to the frame. Additional ground knives 27 and 28 are adjustably mounted in the same fashion on the frame 11, but these knives extend outward laterally away from the crawler tracks 12 and 13 in order to cut cane stalks in rows outboard of the crawler tracks. Thus, as shown in FIG. 6, ground knife 27 cuts stalks in row A, while ground knife 28 cuts stalks in row D.

Vertical power-driven rotary knives 30 and 31 are mounted on the frame in advance of the crawler tracks 12 and 13, respectively. These rotary knives 30 and 31 operate in parallel vertical planes at the side boundaries of the throat 19. Each is mounted on a support 32 and pivotally connected to the frame at 33 and angularly adjusted by means of the double-acting hydraulic cylinder assembly 34. Each rotary knife is powered by an individual hydraulic motor 35. Each support 32 includes a deflector 36 extending at an angle for wedging a path in the cane mat 20 into which the crawler tracks 12 and 13 may move. Inboard deflectors 37 extend into the throat 19 to deflect the cane mat 20 sufficiently for easy clearance through the throat 19. A ground shoe 38 is mounted on each of the supports 32 to assist the operator in maintaining the rotary knives 30 and 31 at the desired elevation. The operator seat 40 and control levers 41 are located in a forward position for optimum visibility.

In operation, the tractor 10 moves into the canefield at any desired location, with the crawler treads 12 and 13 aligned with the space between the rows of cane plants, and with the ground knives 22, 23, 27 and 28 each positioned to cut cane stalks in one particular row. The power-driven rotary knives 30 and 31 in front of the crawler tracks 12 and 13 sever and divide the mat 20 of the cane stalks as the tractor moves forward. The angle deflectors 36 compress the cane stalk mat 20 laterally for a distance sufficient to provide a path in which the crawler treads may pass along the ground. The inboard deflectors 37 compress the cane mat laterally to a lesser extent, so that passage of the cane mat through the throat 19 occurs without difficulty. Since it is not necessary to deflect any unsevered cane more than the width of the tractor treads, the cutter is able to move easily through the field. The relative incompressibility of the cane mat 20 and its attachment to the ground immediately in advance of the severing blades acts to hold the cane in the proper position for cutting. As the cane cutter moves through the field, it separates the mat 20 from the ground at a relatively uniform level and with little disturbance of the original position of the mat. The cane is cut but left in strips with a narrow open space between the strips. In this position, the cane stalks can be conveniently gathered for transport to the mill. This gathering and transporting of the cane mat is accomplished by other devices, not shown.

The positioning of the ground knives 22, 23 and 27, 28 near the longitudinal center of the machine minimizes the vertical movement of the knives occasioned by fore and aft tilting movement of the tractor as it passes over any uneven ground surface.

Figure 8:
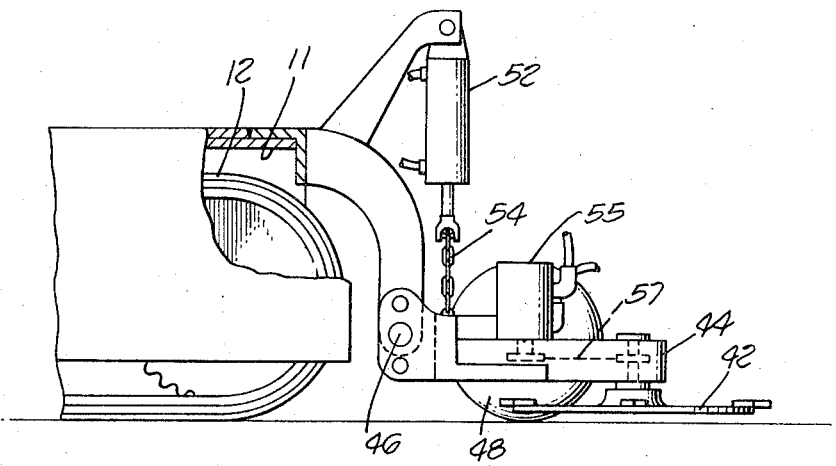
FIG. 8 is a sectional side elevation taken substantially on the lines 8—8 as shown in FIG. 7.

A second form of horizontal cutting means is illustrated in FIGS. 7 thru 10. Horizontal power-driven rotary knives 42 and 43 are mounted on the frame following the crawler tracks 12 and 13 respectively. Horizontal rotary knife 42 is mounted on a support 44 which is pivotally connected to the frame at 46. Similarly horizontal rotary knife 43 is mounted on support 45 which is pivotally connected to the frame at 47. Support 44 is maintained at a predetermined distance from the ground surface by ground wheel 48 connected to the support by axle 50. Ground wheel 49 and axle 51 independently maintains support 45 at a predetermined distance from the ground surface. Each hydraulic cylinder 52 and 53 is attached to an extension of the frame and to the supports 44 and 45 through chains, one of which is shown in FIG. 8 as 54. These hydraulic cylinders permit the raising of the horizontal rotary knives 42 and 43 for the purpose of turning the cutter and transporting it to and from the cane field. The horizontal rotary cutters are driven by hydraulic motors 55 and 56 through a drive chain 57 as shown in FIG. 8.

The operation of these horizontal knives permits the clean cutting of cane even though the cutter is passing over uneven terrain. This is permitted by the independent support of each cutter by the ground wheels 48 and 49. This leveling makes it unnecessary to locate these cutters near the longitudinal center of the machine. It has been found advantageous to counter rotate the horizontal knives and also to provide for adjustment of the cutter height with respect to the ground wheel. The positioning of the horizontal knives relates to the spacing of the cane rows. A typical row spacing for Hawaiian cane is 4½ to 5 feet. An advantageous size of cane cutter straddles two rows of cane. Under these conditions, a spacing of about 36 inches from the centerline of the track to the innermost point of the horizontal knives has proved particularly effective.

A second set of rotary knives may also be located to cut the cane rows adjacent to the outboard shield plates. Further, the rotary knives may be located in front of the tracks instead of trailing them as shown in the drawings. Height-regulating means such as skids may be used in place of the ground wheels to function as a ground-contacting device. The support for the rotary knives may be connected to the frames by any means which permits vertical movement of the support and the rotary knives. This, it can be attached by a pin as shown or simply by chains, cables or the like.

Having fully described our invention, it is to be understood that we are not to be limited in the details herein set forth but that our invention is of the full scope of the appended claims.

We claim:

1. In a cane cutter for use in a field of cane planted in rows and growing as a mat of partially recumbent intermeshed cane stalks, the combination of: a tractor having a frame mounted on parallel endless crawler tracks, means carried on the frame defining an open throat between the crawler tracks of sufficient height to pass over the mat of cane, upright power-driven rotary knives, one in advance of each crawler track, respectively, means on the frame for supporting said rotary knives in alignment with the side boundaries of said throat to cut and divide the mat of cane stalks, angle deflectors, one positioned adjacent each cutting knife, respectively, and cooperating to spread the divided mat of cane stalks outward away from said throat so that the crawler tracks may pass through the divided mat, and cutter means carried on the frame at a position rearward of the rotary knives for severing from the ground cane stalks in that portion of the mat passing through said throat.

2. The cane cutter of claim 1 wherein the supporting means for the rotary knives permit vertical adjustment of said rotary knives.

3. The cane cutter of claim 1 wherein means are provided for changing the elevation of said cutter means with respect to the frame.

4. The cane cutter of claim 1 including additional cutter means on the frame projecting laterally outward therefrom to cut cane stalks in rows outboard of said crawler tracks.

5. The cane cutter of claim 1 wherein said cutter means are mounted on the frame between the ends of said crawler tracks.

6. The cane cutter of claim 1 wherein said cutter means are mounted on a support movably attached to said frame, and a ground-contacting device acting to maintain said support at a predetermined height above ground.

* * * * *